(12) United States Patent
Hwang et al.

(10) Patent No.: US 6,871,075 B2
(45) Date of Patent: Mar. 22, 2005

(54) RRM OPTIMIZATION ON IUR FOR CONGESTION CONTROL

(75) Inventors: Woonhee Hwang, Helsinki (FI); Mattias Wahlqvist, Malaga (ES)

(73) Assignee: Nokia Mobile Phones Ltd., Espoo (FI)

( * ) Notice: Subject to any disclaimer, the term of this patent is extended or adjusted under 35 U.S.C. 154(b) by 3 days.

(21) Appl. No.: 09/859,671

(22) Filed: May 17, 2001

(65) Prior Publication Data

US 2002/0173314 A1 Nov. 21, 2002

(51) Int. Cl.$^7$ ................................. H04Q 7/20
(52) U.S. Cl. ................ 455/453; 455/436; 370/402
(58) Field of Search ................... 455/453, 436, 455/423, 424, 59, 61, 67.1, 67.4, 446, 445, 435; 370/331, 332, 401

(56) References Cited

U.S. PATENT DOCUMENTS

| | | | |
|---|---|---|---|
| 5,734,979 A | * 3/1998 | Lu et al. ................. | 455/445 |
| 5,825,772 A | * 10/1998 | Dobbins et al. ........... | 370/396 |
| 6,317,600 B1 | 11/2001 | Salonaho et al. | |
| 6,381,458 B1 | * 4/2002 | Frodigh et al. ............ | 455/442 |
| 6,405,045 B1 | * 6/2002 | Choi et al. ............... | 370/229 |
| 6,463,286 B1 | * 10/2002 | Salminen .................. | 455/453 |
| 2002/0072363 A1 | * 6/2002 | Riihinen et al. ........... | 455/432 |

OTHER PUBLICATIONS

3GPP TS 24.423 v3.3.0 (Sep. 2000), 3rd Generation Partnership Project; Technical Specification Group Radio Access Network; UTRAN Iur Internace RNSAP Signaling. Tdoc R3–011058, Change Request 25.423; 3GPP SG–RAN3 #19 Meeting Cardiff, Wales, Feb. 26–Mar. 2, 2001 25.423 Rev. 2, v 3.4.0.

* cited by examiner

*Primary Examiner*—David Hudspeth
*Assistant Examiner*—S. Smith

(57) ABSTRACT

An additional parameter is added to be used in parallel or together with a generic "load" value currently proposed for communication between a first radio network controller (controller which performs the measurement) and a second radio network controller suggesting a proposed action. Because the second controller receives the proposed action, it can take the proposed or other appropriate action in order to solve the congestion situation in the first controller more effectively in a multi-vendor environment.

24 Claims, 4 Drawing Sheets

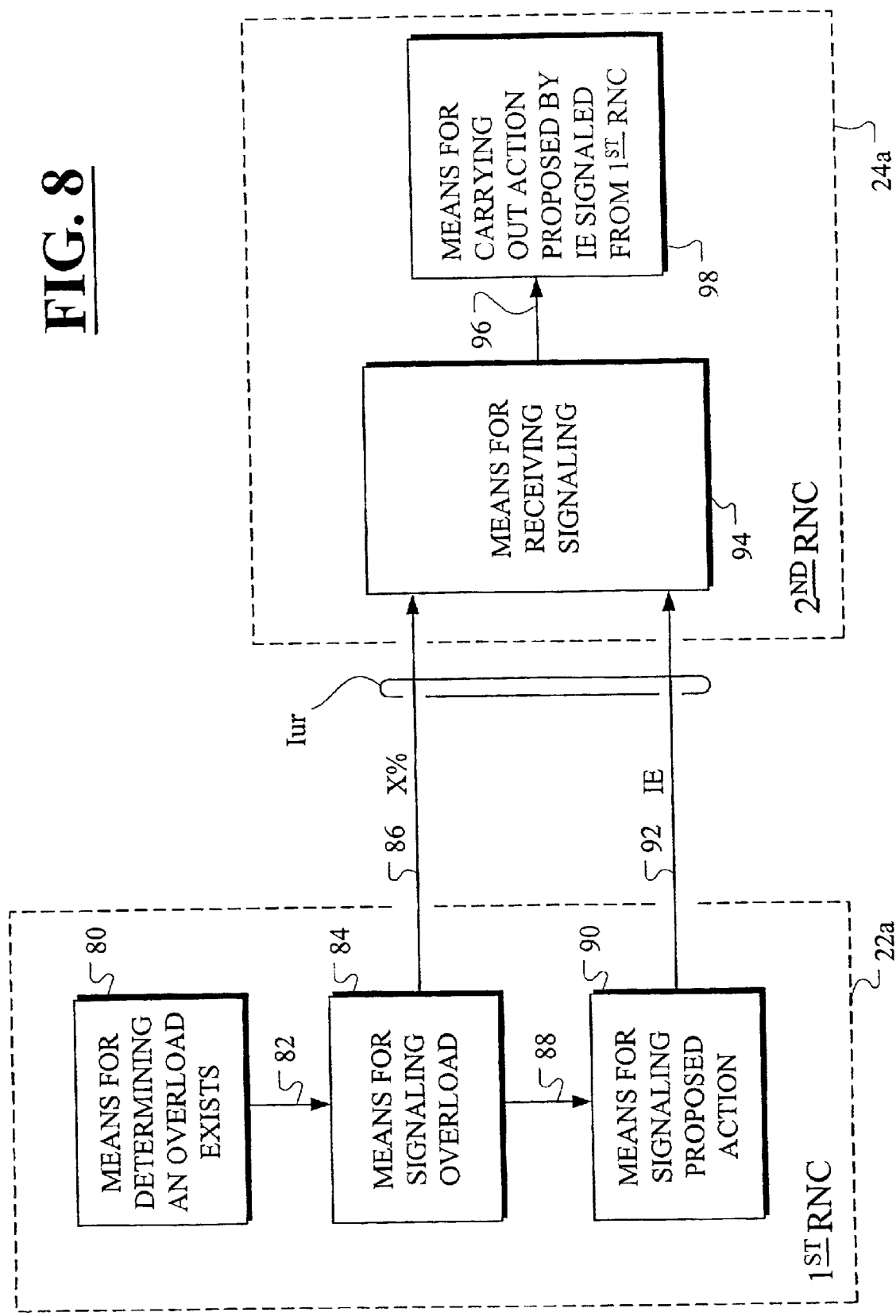

US 6,871,075 B2

RRM OPTIMIZATION ON IUR FOR CONGESTION CONTROL

BACKGROUND OF INVENTION

1. Technical Field

The present invention relates to signaling a second radio network controller a measurement made in a first radio network controller and, more particularly, to a problem relating to interpretation of such signaling.

2. Discussion of Related Art

As a universal terrestrial radio access network (UTRAN) Release 4 proposal (see Change Request CR323 to 25.423 version 3.4.0 3GPP TSG-RAN 3 #19 Meeting Cardiff Wales, Feb. 23–Mar. 2, 2001), a source controller can report load information with a common measurement report on the Iur (see CR 323 Chapter 8.5.x. "Common Measurement Reporting" at pages 60–61). This load information has generic values (0 . . . 9) for the uplink and for the downlink (see CR 323 Table 9.2.1.x. at page 123). This value means, for example, 1=10% loaded, 4=40% loaded. The proposed change request to the specification does not define the generic load value, nor any particular action which the receiver should take with the received value. Each controller that receives this generic value can interpret this information in different ways, depending on the maker. For example, 40% could mean congestion in one controller while for a connected controller from another vendor this might not be considered congested. In addition, a generic value cannot report what type of congestion has occurred. It would be useful to know if it is interference, transport overload, or processing overload so that the receiving controller can better decide what it should do to solve the congestion situation. But in a multi-vendor environment, each vendor can define the value in a different way and each controller can analyze the value in a different way. This is fine for communicating between controllers made by the same vendor, but this doesn't work properly in a multi-vendor environment.

From the foregoing it will be appreciated that in the above described prior art there is a generic load value transferred between the controllers. There is no general solution for how the receiver should interpret this value, regardless of vendor.

SUMMARY OF INVENTION

An object of the present invention is to provide a way for a second controller to interpret a report from a first radio network controller concerning congestion conditions in the first controller so that the second radio network controller can be placed in a position to alleviate the congestion.

According to the first and second aspects of the present invention, method and apparatus are provided for determining in a first controller that an overload condition exists, signaling a second controller that the overload condition exists and a proposed action to alleviate the overload condition. The signaling can be done in a same message or in separate messages. The proposal could be to restrict data flow, carry out an interfrequency handover, carry out an intersystem handover, release one or more radio bearers, or the like.

In further accord with the first and second aspects of the present invention, the second controller can receive the signaling from the first controller and carry out the proposed action to alleviate the overload condition. The alleviation of the overload condition can be carried out in various ways including the above mentioned restriction of data flow, interfrequency or intersystem handover, or releasing of one or more radio bearers.

The present invention adds an additional parameter, by which a first controller (controller which performs the measurement) suggests a desirable reaction for a second controller (controller which receives the suggested action), in addition to the generic "load" value (which is current solution). Because the second controller receives a proposed action, it can take appropriate responsive action in order to solve the congestion situation in the first controller especially in a multi-vendor environment.

This invention can be used by the third generation partnership project (3GPP) universal terrestrial radio access network (UTRAN). In addition, it can be applied to any telecommunication system which has an inter-controller interface, such as the 3GPP inter radio network controller (RNC-RNC) interface (called the Iur interface). Such others could include an inter base station controller (BSC-BSC) interface, or an inter base transceiver station (BTS-BTS) interface in which one controller can provide an action proposal to the other controller to solve a congestion situation.

These and other objects, features and advantages of the present invention will become more apparent in light of the following detailed description of a best mode embodiment thereof, as illustrated in the accompanying drawing.

BRIEF DESCRIPTION OF DRAWINGS

FIG. 8 shows details of an exemplary means for carrying out the present invention.

BEST MODE FOR CARRYING OUT THE INVENTION

Figure 1:
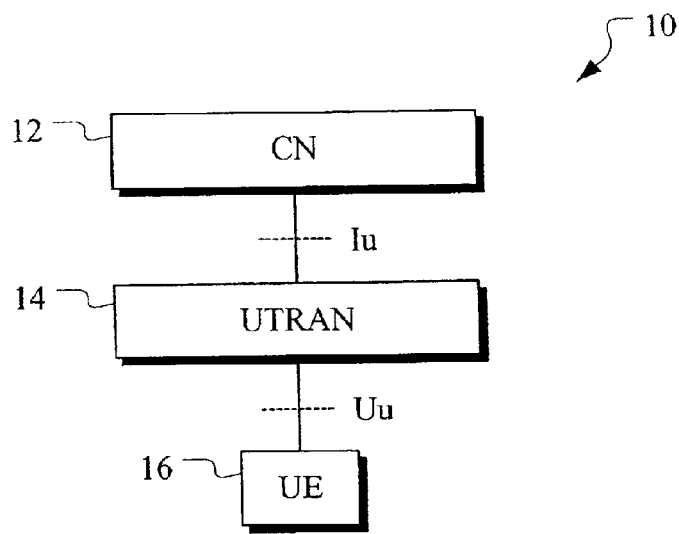
FIG. 1 shows the known 3GPP architecture.
Figure 2:
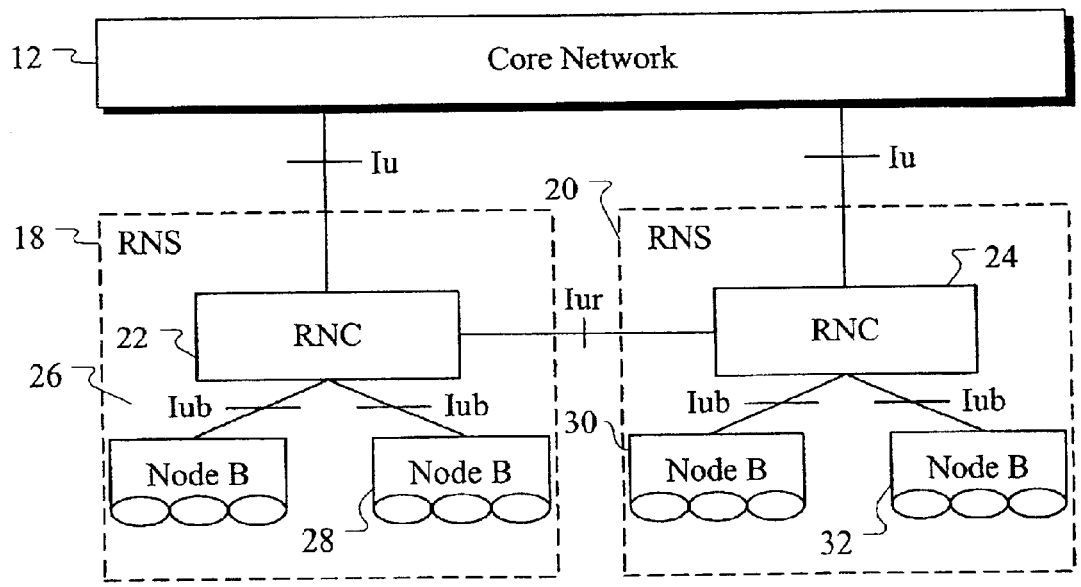
FIG. 2 shows details of the UTRAN of FIG. 1.

FIG. 1 shows the known 3GPP architecture 10 with a core network (CN) 12 connected to a UTRAN 14 by an Iu interface. The UTRAN 14 is connected to user equipment (UE) 16 via a Uu interface which is a radio interface. FIG. 2 shows some details of the UTRAN connected to the CN 12 including a pair of radio network servers (RNSs) 18, 20. Within each RNS is a radio network controller (RNC) 22, 24. Each RNC is connected to a plurality of Node Bs 26, 28, 30, 32 by corresponding Iub interfaces. The Node Bs correspond to the base transceiver stations of the global system for mobile communications (GSM). Unlike GSM, there is advantageously an Iur connection provided between RNCs of the UTRAN. This is due to that fact that within the new UMTS there is introduced a macrodiversity function where data is sent via multiple Node Bs to a UE. Because signals are sent over multiple air interfaces between the same UE and several RNCs, the fading effect is less harmful and lower power levels can be used. In release 99 of the 3GPP specification there was no support provided for RNCs to share load information, i.e., between cells. This was not a problem because most manufacturers probably opted for a "one cell" approach to admission/congestion control.

Figure 3:
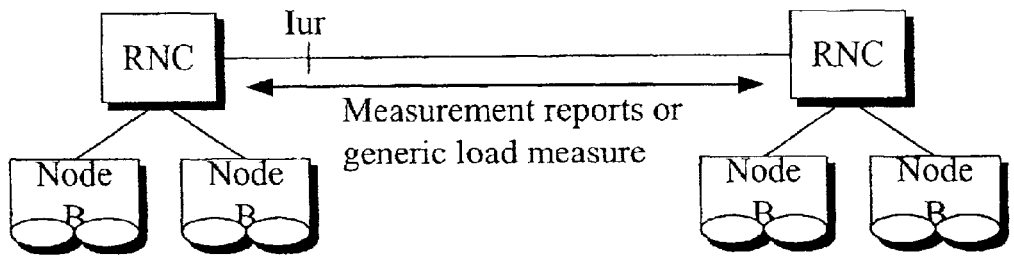
FIG. 3 shows measurement reports or generic load measurements between RNCs, according to a proposal of the prior art.
Figure 4:
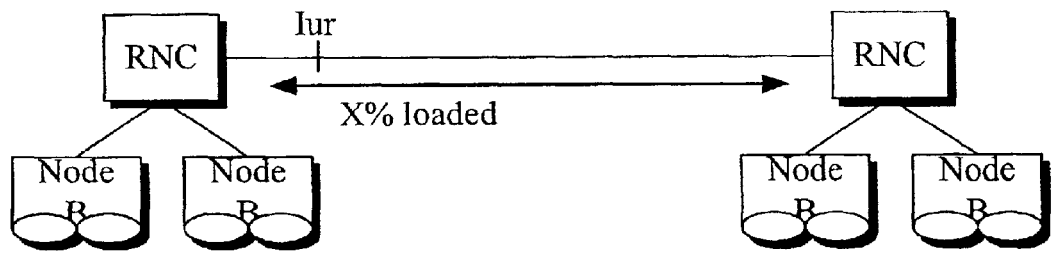
FIG. 4 shows a generic load measurement reported on the Iur interface, according to a proposal of the prior art.
Figure 5:
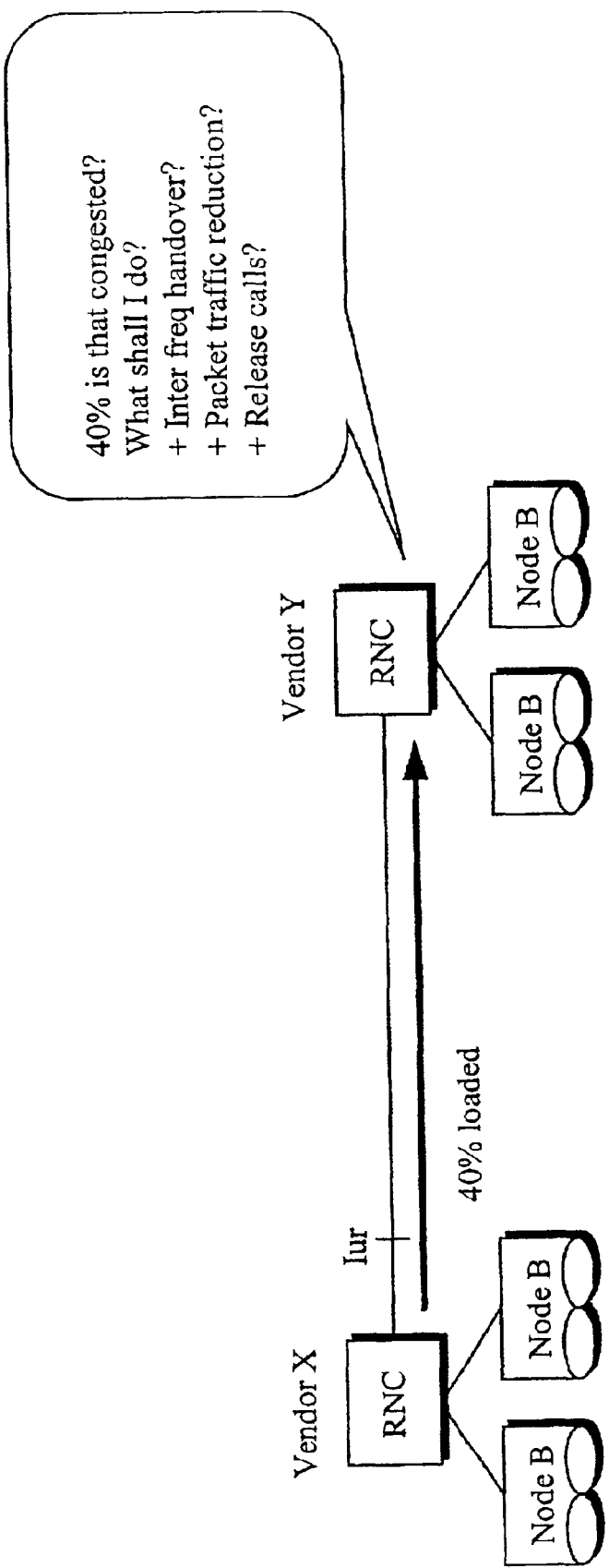
FIG. 5 shows a difficulty of the prior art proposal of FIGS. 3 and 4 in a multi-vendor environment.

As shown in FIG. 3, a 3GPP release 4 work item "RRM Optimization on Iur" was started to solve this problem. A common measurement procedure was proposed in the above mentioned Change Request 323 to TS 25.423 v 3.4.0 so as to allow a first RNC to request a neighboring, second RNC to report common measurements over the Iur. In the proposed common measurement procedure, there are four common measurement types defined: (1) "load", (2) "transmitted carrier power", (3) "received total wide band power", and (4) "UL timeslot ISCP" (see Table 9.2.1.x at page 122 of CR 323 titled "Common Measurement Type"). The present invention improves the type (1) common measurement, i.e., the "load" type. Currently for the "load" measurement reporting procedure (see Table 9.2.1.x titled "Load Value" at page 123 of CR 323), as shown in FIG. 4, generic values (0, 1, . . . , 9) are respectively used for the uplink and downlink. The bidirectional arrow indicates that either RNC can initiate the process and that once initiated, there may be bidirectional exchanges of signaling. See the definition of Elementary Procedures for the radio network subsystem application part (RNSAP) of TS 25.423 v. 3.3.0 (2000–09). The generic value can mean, for example, 1=10% loaded, 4=40% loaded, etc. However, as shown in FIG. 5, since this generic value cannot in and of itself report what the congestion exactly means, e.g., interference, transport overload, or processing overload, the neighboring, second RNC cannot decide what it should do to solve the congestion situation. A way for it to understand the meaning is to for a given vendor to decide internally on a meaning and to define some mapping rule to map each value to some specific type. In a multi-vendor environment, however, each vendor can define the value in a different way and each RNC can therefore analyze the value in a different way. That means the proposal doesn't work in a multi-vendor environment. For the instance shown in FIG. 5, with 40% load reported by Vendor X's RNC, the recipient RNC of Vendor Y doesn't know how to interpret it and therefore doesn't know what to do. Forty percent might mean a high load in the RNC from vendor X, but might at the same time mean a normal load for the RNC of vendor Y. In that case, the receiving RNC from vendor Y would not take any action to alleviate the congestion "overload" problem signaled by the RNC from vendor X because it is reported as a generic value and everybody is free to define what each value means for its own purposes. The specification does not say what are appropriate actions to alleviate congestion. The problem with getting this generic load parameter to mean something is that it is difficult to change an already proposed parameter.

According to the present invention, an additional information element (IE) is provided which allows the first RNC source to suggest a possible reaction for the second, receiving RNC. This IE can be used as a flag to signal a meaning in parallel with the generic load parameter. The IE can, for example, have following values:

Not loaded
Loaded but no problem
Overloaded, admission limitation for RAB with priority<X
Overloaded, admission limitation for RAB with priority<X and proposed congestion action, such as:
Restriction data flow
Inter frequency handover
Inter system handover
Release radio bearer.

The receiving second RNC can consider this information in order to alleviate the congestion situation. The receiving RNC could be made to reply back to the first (source) RNC. This is of course not exhaustive of the possibilities. More congestion alleviation actions could be added. A time element could be added for the execution of the proposed action.

Figure 6:
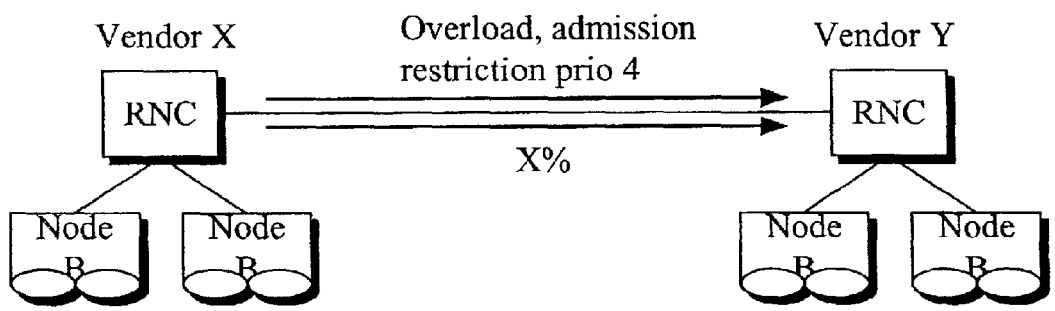
FIG. 6 shows an example of a procedure according to the present invention in which a proposed action to alleviate congestion is proposed in addition to the generic load report from a first RNC of vendor X to a second RNC of vendor Y.

FIG. 6 shows an example of an RNC from vendor X signaling an RNC from vendor Y of a high load situation and that it will not admit new radio bearers with a priority larger than 4 with the smaller numbers having the highest priority, i.e., with 1 being the highest priority. It is up to the receiver RNC what action to take.

Figure 7:
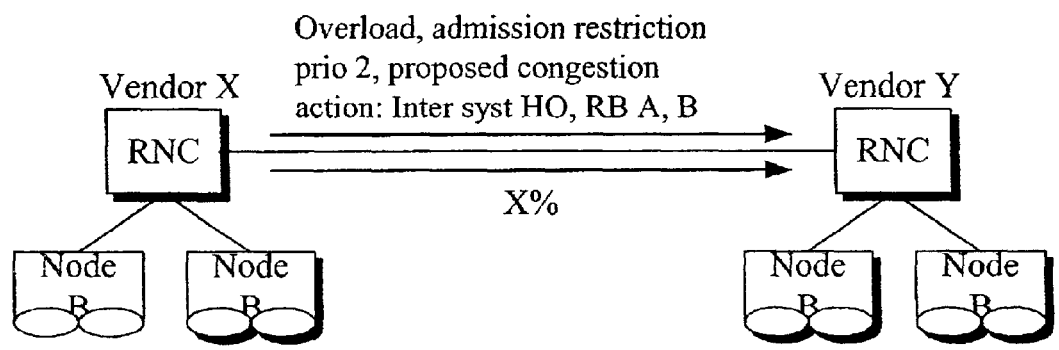
FIG. 7 shows a second example, according to the present invention, of a proposed corrective action reported from a first controller to a second controller in a multi-vendor environment.

FIG. 7 shows another example of the RNC from vendor X signaling a very high load with a proposed congestion action. RNC X signals RNC Y that it will not admit new radio bearers with a priority larger than 2. RNC X also proposes for RNC Y that radio bearers A and B be handed over.

FIG. 8 shows an exemplary first RNC that includes means for carrying out the improved signaling of the present invention. In a first (source) RNC 22a, means 80 are provided for determining an overload condition exists and for signaling on a line 82 of the existence of the overload condition. Means 84 are provided for signaling the overload on a line 86 on the Iur interface to a second (receiving) RNC 24a with a generic load value IE, according to the prior art. According to the present invention, the means 84 also signals on a line 88 to a means 90 for deciding upon a proposed action and signaling same on a line 92 within a new IE to the second RNC 24a. As mentioned above, such an IE could include a proposed congestion action such as (1) restriction of data flow, (2) interfrequency handover, (3) intersystem handover, (4) release radio bearer, or the like. The means 80 can also include means for determining the nature of the overload and conveying that information on the lines 82, 88 to the means 90. Alternatively, this information can be provided on the line 92 to the second RNC. It should be realized that instead of separately, the signals on the lines 86, 92 may be transmitted in the same message on a same signaling line Iur. Likewise, the means 84, 90 can be combined into a single means for carrying out both functions.

At the second (receiving) RNC 24a, means 94 are provided for receiving the signaling on the Iur interface for interpreting both the generic value on the line 86 and the information element on the line 92 with the proposed action. After evaluation, an instruction signal is provided on a line 96 to means 98 for carrying out any action proposed by the IE signal from the first RNC, if the second RNC decides to carry out the proposed action or carry out some other action. Although a response is not shown in FIG. 8, such would normally be provided back to the first RNC from the second RNC if the elementary procedure (EP) adopted according to this invention is of the class 1 type with a response (success or failure) contemplated.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method for sharing load information between radio network controllers connected to a core network by a first standard interface (Iu) and to each other by a second standard interface (Iur) used for facilitating a macrodiversity function where data is sent via multiple Node Bs to a user equipment, said radio network controllers for operating in an environment where the radio network controllers are from a same vendor or from different vendors, comprising the steps of:

determining in said first radio network controller over said standard interface a common measurement load value and that a certain type of load condition exists from among a plurality of different types of load conditions indicative of the nature of the type of load condition in said environment where said data is sent via at least one of said multiple Node Bs connected to a first radio network controller and via at least one of said multiple Node Bs connected to a second radio network controller, signaling said second radio network controller over said standard interface that, said certain load condition exists and including a measurement report with said common measurement load value and, in addition, that said certain type of load condition exists with a proposed action using an information element indicative thereof.

2. The method of claim 1, wherein said proposed action is to restrict data flow.

3. The method of claim 1, wherein the proposed action is to carry out an interfrequency handover.

4. The method of claim 1, wherein the proposed action is to carry out an intersystem handover.

5. The method of claim 1, wherein the proposed action is to release a radio bearer.

6. The method of claim 1, further comprising the steps of:

receiving the signaling from the first controller in the second controller, for considering the certain type of load condition existing in the first radio network controller, the common measurement load value, and the proposed action, and carrying out the proposed action or some other action in said second radio network controller in response to said signaling from the first controller considering the proposed action, the common measurement load value, and the nature of the certain type of load condition existing in the first radio network controller.

7. The method of claim 6, wherein said proposed action is to restrict data flow.

8. The method of claim 6, wherein the proposed action is to carry out an interfrequency handover.

9. The method of claim 6, wherein the proposed action is to carry out an intersystem handover.

10. The method of claim 6, wherein the proposed action is to release a radio bearer.

11. Apparatus for sharing load information between radio network controllers connected to a core network (CN) by a first standard interface (Iu) and to each other by a second standard interface (Iur) used for facilitating a macrodiversity function where data is sent via multiple Node Bs to a user equipment, said radio network controller for operating in an environment where the radio network controllers are from a same vendor or from different vendors, comprising:

means for determining in said first radio network controller a common measurement load value and that a certain type of load condition exists from among a plurality of different types of load conditions indicative of the nature of the type of load condition in said environment where said data is sent via at least one of said multiple Node Bs connected to a first radio network controller and via at least one of said multiple Node Be connected to a second radio network controller; and means for signaling said second radio network controller over said standard interface that said certain load condition exists and including a measurement report with said common measurement load value and that said certain type of load condition exists with a proposed action using an information element indicative thereof.

12. The apparatus of claim 11, wherein said proposed action is to restrict data flow.

13. The apparatus of claim 11, wherein the proposed action is to carry out an interfreguency handover.

14. The apparatus of claim 11, wherein the proposed action is to carry out an intersystem handover.

15. The apparatus of claim 11, wherein the proposed action is to release a radio bearer.

16. The apparatus of claim 11, further comprising:

means for receiving in the second controller the signaling from the first controller for considering the certain type of load condition existing in the first radio network controller, the common measurement load value and the proposed action; and means for carrying out the proposed action or some other action in the second controller to alleviate the overload condition in response to said signaling from the first controller considering the proposed action, the common measurement load value, and the nature of the certain type of load condition existing in the first radio network controller.

17. The apparatus of claim 16, wherein said proposed action is to restrict data flow.

18. The apparatus of claim 16, wherein the proposed action is to carry out an interfrequency handover.

19. The apparatus of claim 16, wherein the proposed action is to carry out an intersystem handover.

20. The apparatus of claim 16, wherein the proposed action is to release a radio bearer.

21. Method for sharing load information between radio network controllers connected to each other by a first standard interface (Iur) and to a same core network by a second standard interface (Iu) and for operating in an environment where the radio network controllers are from a same vendor or from different vendors, comprising the steps of:

determining in a first radio network controller a common measurement load value and that a certain type of load condition exists from among a plurality of different types of load conditions indicative of the nature of the type of load condition, and signaling a second radio network controller over said first standard interface that said certain type of load condition exists, and including a measurement report with said common measurement load value and, in addition, that said certain type of load condition exists with a proposed action using an information element indicative thereof.

22. The method of claim 21, further comprising the steps of:

receiving the signaling from the first controller in the second controller for considering the certain type of load condition existing in the first radio network controller, the common measurement load value and the proposed action, and carrying out the proposed action or some other action considering the proposed action, the common measurement load value, and the nature of the certain type of load condition existing in the first radio network controller.

23. Apparatus for sharing load information between radio network controllers connected to each other by a first standard interface (Iur) and to a same core network by a second standard interface (Iu) and for operating in an environment where the radio network controllers are from a same vendor or from different vendors, comprising:

means for determining in a first radio network controller that a certain type of load condition exists from among a plurality of different types of load conditions indicative of the nature of the type of load condition; and means for signaling a second radio network controller over said first standard interface that said certain type of load condition exists and including a measurement report that said certain type of load condition exists with and with said common measurement load value a proposed action using an information element indicative thereof.

24. The apparatus of claim 23, further comprising:

means for receiving in the second controller the signaling from the first controller for considering the certain type of load condition existing in the first radio network controller, the common measurement load value and the proposed action; and means for carrying out the proposed action or some other action considering the proposed action, the common measurement load value, and the nature of the certain type of load condition existing in the first radio network controller.

* * * * *

UNITED STATES PATENT AND TRADEMARK OFFICE
CERTIFICATE OF CORRECTION

PATENT NO. : 6,871,075 B2  Page 1 of 1
DATED : March 22, 2005
INVENTOR(S) : Hwang et al.

It is certified that error appears in the above-identified patent and that said Letters Patent is hereby corrected as shown below:

<u>Column 6,</u>
Line 6, please change "Node Be" to -- Node Bs --;
Line 18, please change "interfreguency" to -- interferquency --.

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,871,075 B2
DATED : March 22, 2005
INVENTOR(S) : Hwang et al.

It is certified that error appears in the above-identified patent and that said Letters Patent is hereby corrected as shown below:

Column 6,
Line 6, please change "Node Be" to -- Node Bs --;
Line 18, please change "interfreguency" to -- interfrequency --.

This certificate supersedes Certificate of Correction issued July 12, 2005.

Signed and Sealed this

Sixth Day of December, 2005

JON W. DUDAS
*Director of the United States Patent and Trademark Office*